(12) United States Patent
Sbriglia

(10) Patent No.: US 10,577,468 B2
(45) Date of Patent: Mar. 3, 2020

(54) METHOD FOR PRODUCING POROUS ARTICLES FROM ULTRA HIGH MOLECULAR WEIGHT POLYETHYLENE

(71) Applicant: W. L. Gore & Associates, Inc., Newark, DE (US)

(72) Inventor: Guy A. Sbriglia, Christiana, PA (US)

(73) Assignee: W L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 15/145,879

(22) Filed: May 4, 2016

(65) Prior Publication Data

US 2016/0297937 A1    Oct. 13, 2016

Related U.S. Application Data

(62) Division of application No. 14/169,039, filed on Jan. 30, 2014, now Pat. No. 9,926,416.
(Continued)

(51) Int. Cl.
*C08J 5/18* (2006.01)
*B29C 43/24* (2006.01)
(Continued)

(52) U.S. Cl.
CPC ............ *C08J 5/18* (2013.01); *B29C 43/24* (2013.01); *B29C 67/205* (2013.01);
(Continued)

(58) Field of Classification Search
CPC ................................ C08J 5/18; C08J 2323/06
See application file for complete search history.

(56) References Cited

U.S. PATENT DOCUMENTS 5,004,778 A * 4/1991 Waagen ............... B29C 55/005
264/119
5,478,906 A   12/1995 Howard, Jr.
(Continued)

FOREIGN PATENT DOCUMENTS

| JP | 2010-235926 | 10/2010 |
| WO | WO 91/01210 | 2/1991 |
| WO | WO01/45766 | 6/2001 |

OTHER PUBLICATIONS

Seng Shui Zang, "A review on the separator of liquid electrolyte Li-ion batteries", Journal of Power Sources, 164 (2007) pp. 351-364.
(Continued)

*Primary Examiner* — Hai Vo
(74) *Attorney, Agent, or Firm* — Amy L. Miller

(57) ABSTRACT

Ultra high molecular weight polyethylene (UHMWPE) polymers that have an average molecular weight of at least 500,000 g/mol and an enthalpy of at least 190 J/g is provided. The UHMWPE polymer may include at least one comonomer. The UHMWPE polymer is used to form a membrane, that when expanded, has a node and fibril structure. The UHMWPE membrane has an endotherm of about 150° C. associated with the fibrils in the membrane. The membrane has a percent porosity of at least 25%, and in exemplary embodiments, the percent porosity is at least 60%. Additionally, the UHMWPE membrane has a thickness less than 1 mm. An UHMWPE membrane may be formed by lubricating the UHMWPE polymer, subjecting the lubricated polymer to pressure at a temperature below the melting point of the UHMWPE polymer to form a tape, and expanding the tape at a temperature below the melting temperature of the UHMWPE polymer.

11 Claims, 10 Drawing Sheets

Related U.S. Application Data

(60) Provisional application No. 61/758,617, filed on Jan. 30, 2013.

(51) Int. Cl.
| | |
|---|---|
| *C08F 210/02* | (2006.01) |
| *B29C 67/20* | (2006.01) |
| *C08F 110/02* | (2006.01) |
| *B29C 55/12* | (2006.01) |
| *B29L 31/00* | (2006.01) |
| *B29K 23/00* | (2006.01) |
| *B29C 43/00* | (2006.01) |
| *B29K 105/04* | (2006.01) |

(52) U.S. Cl.
CPC .......... *C08F 210/02* (2013.01); *B29C 43/003* (2013.01); *B29C 55/12* (2013.01); *B29K 2023/0683* (2013.01); *B29K 2105/04* (2013.01); *B29K 2995/0077* (2013.01); *B29L 2031/755* (2013.01); *C08F 110/02* (2013.01); *C08J 2323/06* (2013.01); *Y10T 428/139* (2015.01)

(56) References Cited

U.S. PATENT DOCUMENTS

| | | |
|---|---|---|
| 6,837,890 B1 | 1/2005 | Chludzinski |
| 6,949,315 B1 | 9/2005 | Samii et al. |
| 2002/0156494 A1 | 10/2002 | Simhambhatla et al. |
| 2003/0149126 A1 | 8/2003 | Martakos et al. |
| 2004/0186588 A1 | 9/2004 | Sridharan et al. |
| 2005/0121825 A1 | 6/2005 | Rastogi et al. |
| 2005/0165495 A1 | 7/2005 | Merrill et al. |
| 2006/0079595 A1 | 4/2006 | Schroeder et al. |
| 2008/0254260 A1 | 10/2008 | Harding et al. |
| 2008/0300332 A1 | 12/2008 | Miller et al. |
| 2010/0295203 A1 | 11/2010 | Harding et al. |
| 2011/0076440 A1 | 3/2011 | Steeman |
| 2011/0268952 A1 | 11/2011 | Eem Van Der et al. |

OTHER PUBLICATIONS

R. S. Webber, K.L. Alderson, and K. E. Evans, "Novel Variations in the Microstructure of the Auxetic Microporous Ultra-High Molecular Weight Polyethylene. Part 1: Processing and Microstructure" Polymer Engineering and Science, Aug. 2000, vol. 40. No. 8, pp. 1894-1905.

R. S. Webber, K.L. Alderson, and K. E. Evans, "A Novel Fabrication Route for Auzetic Polyethylene, Part 2: Mechanical Properties", Polymer Engineering and Science, 2008, pp. 1351-1358.

K.L. Alderson, R. S. Webber, and K. E. Evans "Microstructural evolution in the processing of auxetic microporous polymers" Physical Status Solidi (b) 244, No. 3, (2007), p. 828-841.

A. P. Pickles, R.S. Webber, K.L. Alderson, P. J. Neale, "The effect of the processing parameters on the fabrication of auxetic polyethylene Part 1 the effect of compaction conditions" Journal of Materials Science 30 (1995) pp. 4059-4068.

K. L. Alderson, A. P. Kettle, P. J. Neale, A. P. Pickles, "The effect of the processing parameters on the fabrication of auxetic polyethylene. Part II The Effect of sintering temperature and time", Journal of Material Science 30, (1995), pp. 4069-4075.

P. J. Neale, A. P. Pickles, K. L. Alderson, "The effect of the processing parameters on the fabrication of auxetic polyethylene, Part III The effect of extrusion conditions", Journal of Material Science 30, (1995), pp. 4087-4094.

\* cited by examiner

METHOD FOR PRODUCING POROUS ARTICLES FROM ULTRA HIGH MOLECULAR WEIGHT POLYETHYLENE

FIELD OF THE INVENTION

The present invention relates generally to ultra high molecular weight polyethylene (UHMWPE) polymers, and more specifically, to a process for the formation of porous articles from a highly crystalline ultra high molecular weight polyethylene polymer.

BACKGROUND OF THE INVENTION

Ultra high molecular weight polyethylene is well known in the art. Articles made from ultra high molecular weight polyethylene possess properties such as toughness, impact strength, abrasion resistance, low coefficient of friction, gamma resistance, and resistance to attack by solvents and corrosive chemicals. Because of the favorable attributes associated with ultra high molecular weight polyethylene, ultra high molecular weight polyethylene has been utilized in a variety of applications, such as load-bearing components of articulating joint prostheses, vibration dampener pads, hydraulic cylinders, sports equipment, including, but not limited to, skis, ski poles, goggle frames, protective helmets, climbing equipment, and in specialized applications in aerospace.

UHMWPE polymers can be processed by compression molding, ram extrusion, gel spinning, and sintering. However, these conventional processes have one or more undesirable feature or attribute, such as requiring high solvent levels, processing above the melt temperature of the UHMWPE polymer, result in a non-porous structure, and/or are costly or slow to process due to the high viscosity of the UHMWPE polymer. Thus, there exists a need in the art for a process for making an UHMWPE article that is processed below the melt, has high strength, has a microstructure of nodes and fibrils for ease of processing, and is highly porous.

SUMMARY OF THE INVENTION

It is an object of the present invention to provide a method of making a porous ultra high molecular weight polyethylene (UHMWPE) membrane that includes (1) lubricating an ultra high molecular weight polyethylene polymer that has a molecular weight of at least 500,000 g/mol to form a lubricated polymer, (2) subjecting the lubricated polymer to pressure at a temperature below the melting point of the ultra high molecular weight polyethylene polymer to form a tape, and (3) expanding the tape at a temperature below the melt temperature of the ultra high molecular weight polyethylene polymer to form a membrane. The UHMWPE membrane has a structure of nodes interconnected by fibrils. In addition, the UHMWPE membrane has an endotherm from about 145° C. to about 155° C. that is associated with the fibrils in the membrane. In at least one embodiment, the lubricated UHMWPE polymer is ram extruded. Optionally, the tape may be calendered at a temperature below the melt temperature of the UHMWPE polymer. The calendaring temperature may be from about 120° C. to about 135° C. Additionally, the lubricant may be removed from the tape prior to expanding. The UHMWPE polymer has a melt temperature (endotherm) from about 139° C. to about 143° C.

It is another object of the present invention to provide a method for making porous ultra high molecular weight polyethylene (UHMWPE) membranes that include (1) subjecting a lubricated UHMWPE polymer having a molecular weight of at least 500,000 g/mol and a melt enthalpy of at least 190 J/g to pressure and heat below the melt temperature of the UHMWPE polymer to form a tape and (2) expanding the tape below the melt temperature of the UHMWPE polymer to form a porous UHMWPE membrane. The subjecting step may include ram extruding the lubricated UHMWPE polymer. Also, the tape may optionally be calendered at a temperature from about 120° C. to about 135° C. In exemplary embodiments, the molecular weight of the UHMWPE polymer is between about 2,000,000 g/mol and about 4,000,000 g/mol. In addition, the UHMWPE may include at least one comonomer.

It is yet another embodiment of the present invention to provide a porous membrane formed from a UHMWPE polymer having a molecular weight of at least 500,000 g/mol and a melt enthalpy of at least 190 J/g. The UHMWPE membrane has a node and fibril structure. In addition, the UHMWPE membrane displays a first endotherm associated with the UHMWPE polymer and a second endotherm associated with the fibrils in the membrane. The UHMWPE membrane is thin, having a thickness less than about 1 mm, and in some embodiments, from about 0.08 mm to about 0.5 mm. Additionally, the UHMWPE membrane may have a percent porosity of at least 60%.

It is an advantage of the present invention that a UHMWPE membrane has a percent porosity up to 90%.

It is an advantage of the present invention that expanded UHMWPE polymer membranes are porous and have high strengths.

It is a feature of the present invention that processing of the UHMWPE polymer occurs below the melt temperature of the UHMWPE polymer.

It is another feature of the present invention that the expanded UHMWPE membranes have a node and fibril structure.

It is a further feature of the present invention that there is an endotherm associated with fibrils in the expanded UHMWPE membrane.

It is also a feature of the present invention that the UHMWPE polymer may include at least one comonomer.

BRIEF DESCRIPTIONS OF FIGURES

The advantages of this invention will be apparent upon consideration of the following detailed disclosure of the invention, especially when taken in conjunction with the accompanying drawings wherein.

DETAILED DESCRIPTION OF THE INVENTION

The invention relates to ultra high molecular weight polyethylene (UHMWPE) polymers that have an average molecular weight (Mw) of at least about 500,000 g/mol and a high degree of crystallinity. In exemplary embodiments, the average molecular weight of the UHMWPE polymer is between about 500,000 g/mol and about 10,000,000 g/mol, between about 1,000,000 g/mol and about 8,000,000 g/mol, between about 1,000,000 g/mol and about 6,000,000 g/mol, or between about 2,000,000 g/mol and about 4,000,000 g/mol. The crystallinity of the UHMWPE polymer may be measured by differential scanning calorimetry (DSC). The UHMWPE polymer has an enthalpy of the first melt at least about 190 J/g. As used herein, the phrases "high crystallinity" or "highly crystalline" are meant to describe a UHMWPE polymer that has a first melt enthalpy greater than 190 J/g as measured by DSC.

In addition, the UHMWPE polymer may be a homopolymer of ethylene or a copolymer of ethylene and at least one comonomer. Suitable comonomers that may be used to form a UHMWPE copolymer include, but are not limited to, an alpha-olefin or cyclic olefin having 3 to 20 carbon atoms. Non-limiting examples of suitable comonomers include 1-butene, 1-pentene, 1-hexene, 1-heptene, 1-octene, cyclohexene, and dienes with up to 20 carbon atoms (e.g. butadiene or 1,4-hexadiene). Comonomers may be present in the UHMWPE copolymer in an amount from about 0.001 mol % to about 10 mol %, from about 0.01 mol % to about 5 mol %, or from about 0.1 mol % to about 1 mol %.

Additionally, the ultra high molecular weight polyethylene UHMWPE polymers of the invention have a melting point from about 139° C. to about 143° C. It is to be noted that the terms "melting temperature", "melt temperature", and "melting point" may be used interchangeably herein. In at least one exemplary embodiment, the UHMWPE polymer has a melting point of approximately 140° C. Subsequent re-melting of the UHMWPE polymer occurs at a temperature from about 127° C. to about 137° C.

Figure 1:
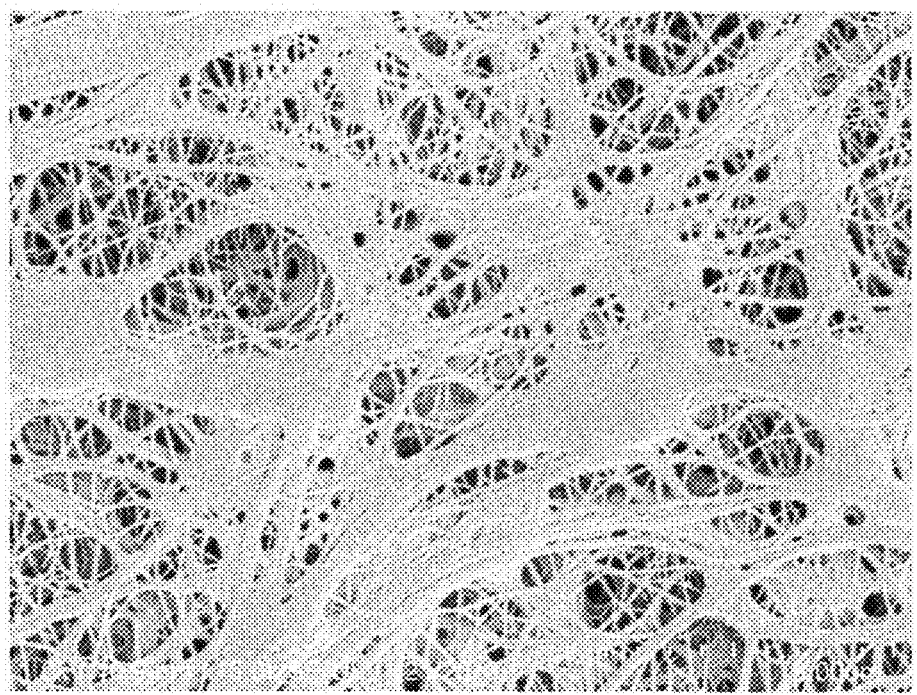
FIG. 1 is a scanning electron micrograph (SEM) of the surface of the expanded UHMWPE membrane of Example 2 taken at 15,000× magnification.
Figure 4:
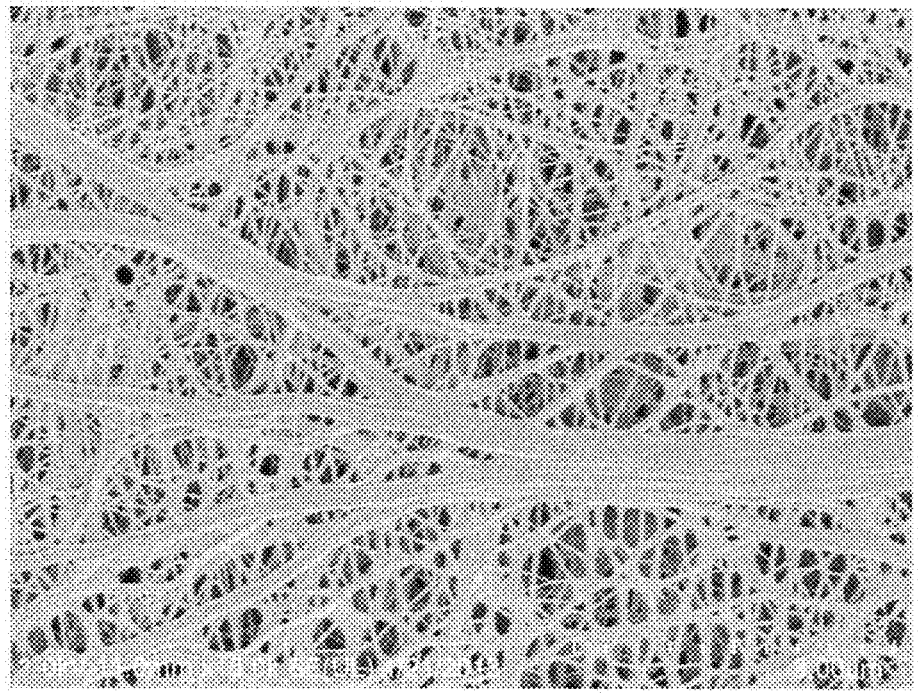
FIG. 4 is a scanning electron micrograph (SEM) of the surface of the expanded UHMWPE membrane of Example 3 taken at 15,000× magnification.
Figure 6:
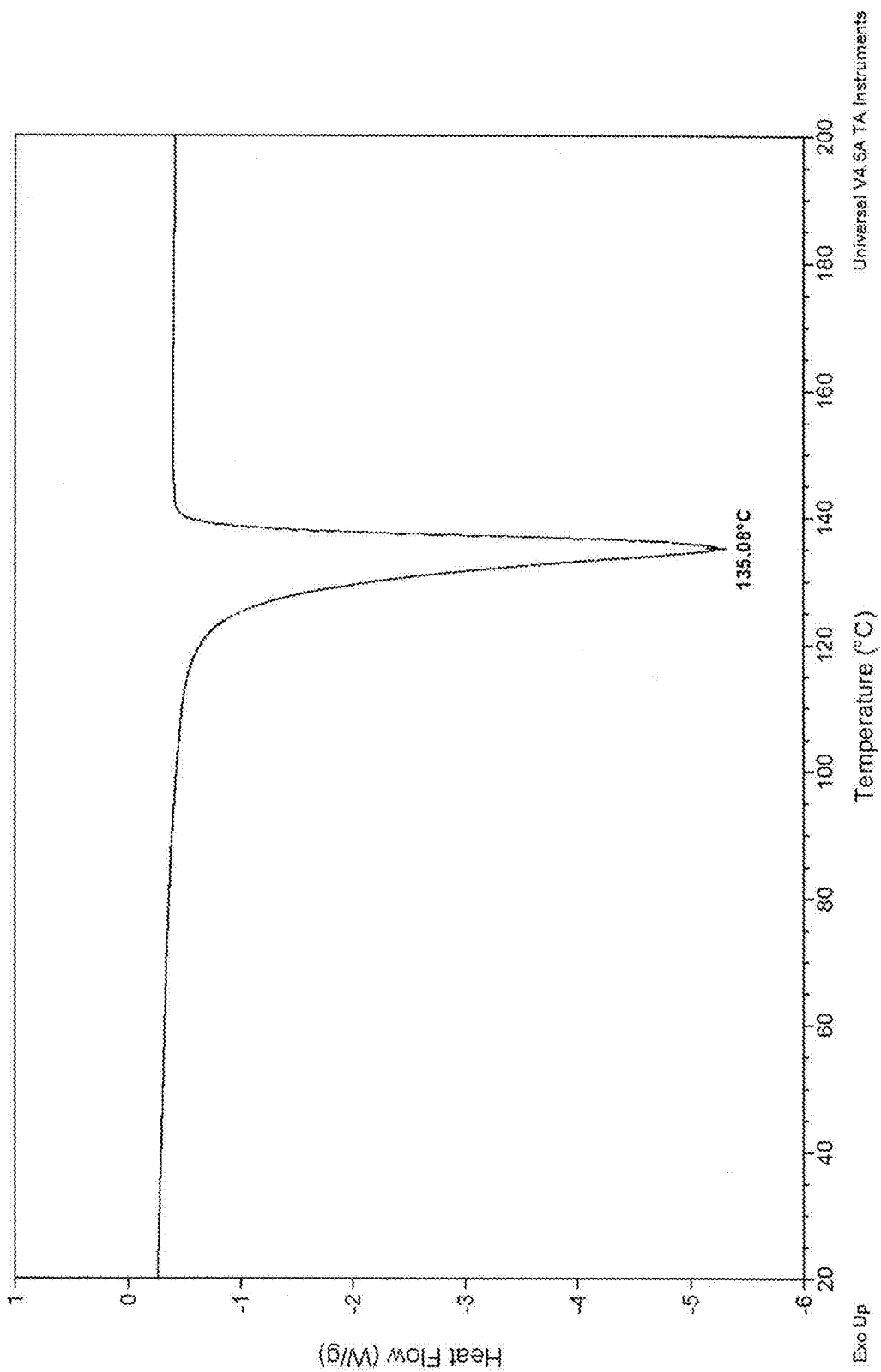
FIG. 6 is a differential scanning calorimetry (DSC) thermogram of a sample prior art UHMWPE membrane made by a conventional process showing a single melt point.
Figure 7:
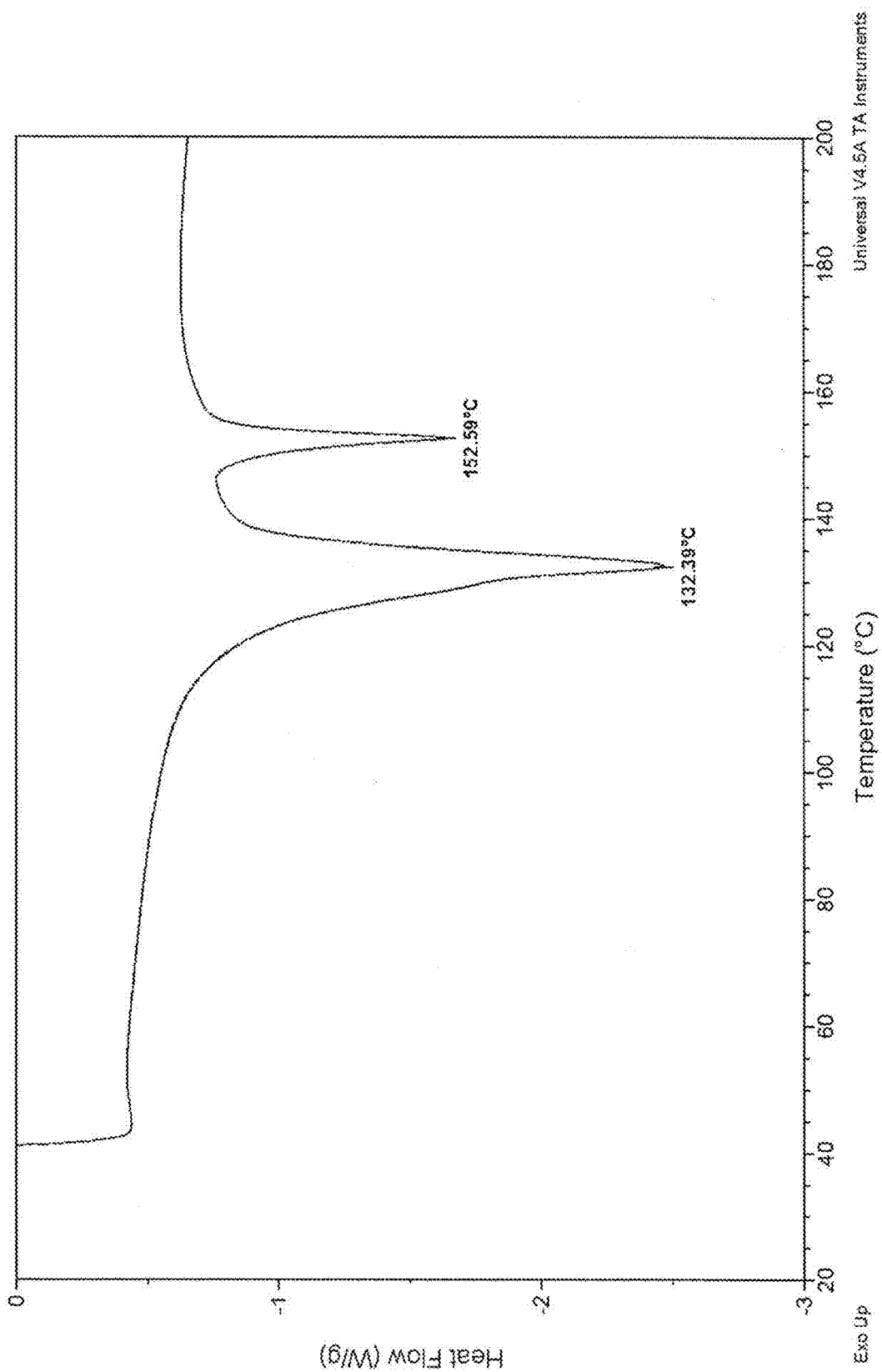
FIG. 7 is a differential scanning calorimetry (DSC) thermogram depicting two distinct melting points associated with an expanded UHMWPE membrane made in accordance with the methods described herein.

When the UHMWPE polymer is formed into a membrane, the expanded UHMWPE membrane has a node and fibril structure, as can be seen in FIGS. 1 and 4. Node, as defined herein, is meant to describe the connection point of at least two fibrils. In addition, the UHMWPE membrane has an endotherm from about 145° C. to about 155° C., or about 150° C., that is associated with the fibrils in the membrane. Differential Scanning calorimetry (DSC) can be used to identify the melting temperatures (crystalline phases) of the UHMWPE polymers. FIG. 7 shows a DSC thermograph of an exemplary UHMWPE membrane having a reduced melt temperature at about 132° C. and an endotherm at approximately 152° C. This approximate 150° C. peak (or endotherm) is indicative of the presence of fibrils in the expanded UHMWPE membrane. It is to be appreciated that an endothermic peak of about 150° C. is not present in conventional processed UHMWPE porous membranes, but is present in the UHMWPE membranes described herein. A DSC thermograph for a conventional UHMWPE membrane is shown in FIG. 6, depicting the single melting peak (melting temperature) at approximately 135° C.

The UHMWPE polymer may have a percent porosity that is greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, or up to (and including) 90%. In exemplary embodiments, the UHMWPE polymer may have a percent porosity from about 25% to about 90%, from about 40% to about 90%, from about 50% to about 90%, or from about 60% to about 90%.

The UHMWPE polymer described herein may be manufactured by a polymerization process where ethylene (optionally a modified or slightly modified ethylene), optionally in the presence of a comonomer, is polymerized in the presence of a polymerization catalyst at a temperature below the crystallization temperature of the polymer. Such polymerization causes the polymer to crystallize immediately after formation. More specifically, the reaction conditions are selected so that the polymerization speed is lower than the crystallization speed. Such synthesis conditions force the molecular chains to crystallize immediately upon their formation, leading to a morphology that differs from that which is obtained by the solution or melt. It is to be noted that the crystalline morphology created at the surface of a catalyst will depend on the ratio between the crystallization rate and the growth of the polymer. Further, the synthesis temperature, which in this case is also the crystallization temperature, will influence the morphology of the thus obtained UHMWPE polymer. With UHMWPE polymers, the particle size, shape, and distribution thereof are important to obtain the desired porous structures. These particle characteristics affect the packing density as well as connection density, thereby affecting the porous structures that can be produced from the particles.

The UHMWPE resin is provided in a particulate form, for example, in the form of a powder. UHMWPE powders are formed of individual particles having a particulate size less than about 100 nm. Typically powders are supplied as a cluster of particles having size from about 5 to about 250 microns or from about 10 microns to about 200 microns. In exemplary embodiments, the clusters have a size as small as possible, down to and including individual particles.

In forming a porous article from the UHMWPE polymer, the UHMWPE polymer is first mixed with a lubricant, such as a light mineral oil. Other suitable lubricants include aliphatic hydrocarbons, aromatic hydrocarbons, halogenated hydrocarbons, and the like, that are selected according to flammability, evaporation rate, and economical considerations. It is to be appreciated that the term "lubricant", as used herein, is meant to describe a processing aid consisting of an incompressible fluid that is not a solvent for the polymer at the process conditions. The fluid-polymer surface interactions are such that it is possible to create a homogenous mixture. It is also to be noted that that choice of lubricant is not particularly limiting and the selection of lubricant is largely a matter of safety and convenience. The lubricant may be added to the UHMWPE polymer in a ratio 1 ml/100 g to about 100 ml/100 g or from about 10 ml/100 g to about 70 ml/100 g. Once the lubricant is added, the mixture is maintained below the melt temperature of the UHMWPE polymer for a period of time sufficient to wet the interior of the clusters of the polymer with the lubricant. A "sufficient period of time" may be described as a time period sufficient for the particles to return to a free-flowing powder. Upon initial addition of lubricant, prior to wetting the interior of the clusters, the mixture is a wet, viscous mass.

After the lubricant has been uniformly distributed to the surface of the particles (e.g., wet the interior of the clusters), the mixture returns to a free flowing, powder-like state. In exemplary embodiments, the mixture is heated to a temperature below the melt temperature of the UHMWPE polymer or the boiling point of the lubricant, whichever is lower. It is to be appreciated that various times and temperatures may be used to wet the polymer so long as the lubricant has a sufficient time to adequately wet the interior of the clusters.

Once lubricated, the particles can be formed into solid shapes, (fibers, tubes, tapes, sheets, three dimensional self-supporting structures, etc.) without exceeding the melt temperature of the polymer. The lubricated particles are heated to a point below melting, temperature of the polymer and with the application of sufficient pressure and shear to form inter-particle connections and create a solid form. Non-limiting examples of methods of applying pressure and shear include ram extrusion (e.g., typically called paste extrusion or paste processing when lubricant is present) and optional calendering.

In one exemplary embodiment, the lubricated UHMWPE polymer is calendered to produce a cohesive, flexible tape. As used herein, the term "cohesive" is meant to describe a tape that is sufficiently strong for further processing. The calendering occurs from about 120° C. to about 135° C. or from about 125° C. to about 130° C. The tape formed has an indeterminate length and a thickness less than about 1 mm. Tapes may be formed that have a thickness from about 0.01 mm to about 1 mm from about 0.08 mm to about 0.5 mm, or from 0.05 mm to 0.2 mm, or even thinner. In exemplary embodiments, the tape has a thickness from about 0.05 mm to about 0.2 mm.

In a subsequent step, the lubricant may be removed from the tape. In instances where a mineral oil is used as the lubricant, the lubricant may be removed by washing the tape in hexane or other suitable solvent. The wash solvent is chosen to have excellent solubility for lubricant and sufficient volatility to be removed below the melting point of the resin. If the lubricant is of sufficient volatility, the lubricant may be removed without a washing step, or it may be removed by heat and/or vacuum. The tape is then optionally permitted to dry, typically by air drying. However, any conventional drying method may be used as long as the temperature of heating the sample remains below the melting point of the UHMWPE polymer.

The first melting temperature of the highly crystalline UHMWPE polymer (i.e., from approximately 139° C. to approximately 143° C.) is irreversible in that subsequent melting and re-crystallization occurs at a lower temperature (second melting temperature) than the first inciting temperature. The second melting temperature of the UHMWPE polymer is approximately 127° C. to approximately 137° C. A unique feature of some embodiments of this invention is that the higher first melting temperature may be retained in the final porous article. Additionally, there is a surprising feature in the DSC of the inventive UHMWPE membranes in that the inventive UHMWPE membranes show an endotherm at approximately 150° C. associated with the fibrils, which is at a temperature higher than the melting temperature associated with the original UHMWPE polymer prior to processing.

The tapes, once dried, are cut to suitable sizes for expansion. Expansion of these samples occurs at temperatures from about 120° C. to about 135° C. or from about 125° C. to about 130° C. (i.e., below the inch temperature of the UHMWPE polymer). The samples may be expanded in one or more directions to form a porous membrane. Expansion, either uniaxial or biaxial, may be conducted at rates up to 20,000%/second, or from 1% to 20,000%/second. It has been discovered that an increase in strength concurrently occurs upon expansion. The increase in strength of the polymer matrix is dependent upon the strength of the tape prior to expansion, the quality of the resin (e.g., particle size, molecular weight, distribution of particle size and/or molecular weight, degree of crystallinity, composition of polymer, and the like) the temperature at which expansion is performed, the rate of expansion, and the total amount of expansion.

The expanded membrane has a structure of nodes interconnected by fibrils, such as may be seen in FIGS. 1 and 4. The porous microstructure of the expanded membrane is affected by the temperature and rate at which it is expanded. The geometry of the nodes and fibrils can be controlled by the selection of resin, the rate of expansion, temperature of expansion, and ultimate expansion ratio. Tapes that that have been expanded at higher temperatures (but still below the melt temperature of the UHMWPE polymer) and greater rates are substantially homogenous, meaning that that have smaller, more closely spaced nodes that are interconnected by a greater number of fibrils. In addition, tapes expanded at higher temperatures and greater rates tend to possess a greater strength compared to membranes formed by expanding tapes at lower temperatures and lower rates.

Test Methods

It should be understood that although certain methods and equipment are described below, any method or equipment determined suitable by one of ordinary skill in the art may be alternatively utilized.

Thickness Measurements

Thickness was measured by placing the sample between the two plates of a Miyutoyo thickness gauge (Miyutoyo Corporation, Kawasaki, Japan). The average of the multiple measurements was resported.

Percent Porosity Calculation

Density was used to calculate the percent porosity of expanded materials using 0.94 g/cc as the full density of the sample. Samples were die cut to form rectangular sections 9.05 cm by 5.08 cm. Each sample was weighed using a AND Model HF 400 balance, and then the thickness of the samples was taken using a Miyutoyo thickness gauge (Miyutoyo Corporation, Kawasaki, Japan). Using this data, a density of the sample can be calculated with the following formula:

$$\rho = \frac{m}{w*l*t}$$

where: ρ=density (g/cc)
m=mass (g)
w=width (9.05 cm)
l=length (5.08 cm)
t=thickness (cm)

The reported results are the average of at least 3 calculations.

Matrix Tensile Strength (MTS)

Tensile break load was measured using an INSTRON 5500R tensile test machine equipped with flat-faced grips and a "200 lb" load cell. The gauge length was 19 mm and the cross-head speed was 20.3 cm/min. For longitudinal MTS measurements, the larger dimension of the sample was oriented in the calendering direction, which was designated the "machine direction". For the transverse MTS measurements, the larger dimension of the sample was oriented perpendicular to the calendering direction, which was designated the "transverse direction".

The sample from the density measurement was used for tensile testing. The sample dimensions were 50.8 mm by 12.7 mm. The effective thickness is calculated from the mass, the area, and the density of the sample. Two samples were then tested individually on the tensile tester. The average of the two maximum load (i.e., the peak force) measurements was reported. The longitudinal and transverse MTS were calculated using the following equation:

MTS=(maximum load/cross-section area)*(density of UHMWPE)/density of the sample), wherein the density of UHMWPE is taken to be 0.94 g/cc.

Bubble Point Measurements

The Bubble Point was measured according to the procedures of ASTM F316-86. Isopropyl alcohol was used as the wetting fluid to fill the pores of the test specimen. The reported value represents the average measurements for three samples.

The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

Gurley Air Flow

The Gurley air flow test measures the time in seconds for 100 $cm^3$ of air to flow through a 6.45 $cm^2$ sample at 12.4 cm of water pressure. The samples were measured in a Gurley Densometer Model 4110 Automatic Densometer equipped with a Gurley Model 4320 automated digital timer. The reported results are the average of multiple measurements.

SEM Surface Sample Preparation Method

The SEM samples were imaged at 1.0 keV using an Hitachi SU 8000 Field Emission scanning electron microscope with mixed Upper and Lower Second Electron detectors.

SEM Cross-Section Sample Preparation Method

Cross-section SEM samples were prepared by spraying them with liquid nitrogen and then cutting the sprayed samples with a diamond knife in a Leica ultracut UCT, available from Leica Microsystems, Wetzlar, Germany. The SEM samples were imaged at 1.0 keV using an Hitachi SU 8000 Field Emission scanning electron microscope with mixed Upper and Lower Second Electron detectors.

DSC Measurements

DSC data was collected using a TA Instruments Q2000 DSC between 35° C. and 220° C. using a heating rate of 10° C./min. For resins samples, approximately 5 mg of powder was placed into a standard pan-and-lid combination available from TA instruments. The membrane samples were prepared by punching 4 mm disks. The 4 mm disk was placed flat in the pan and the lid was crimped to sandwich the membrane disk between the pan and lid. A linear integration scheme from 80° C., to 180° C. was used to integrate the melting enthalpy data. Subsequent de-convolution of the melting region was accomplished using the PeakFit software from SeaSolve Software (PeakFit v4.12 for Windows, Copyright 2003, SeaSolve Software Inc.) Standard conditions were used to fit a baseline (after inverting the data to generate "positive" peaks) and subsequently resolve the observed data into its individual melting components.

EXAMPLES

It is to be understood that the following examples were conducted on a lab scale but could be readily adapted to a continuous or semi-continuous process.

Example 1

Figure 8:
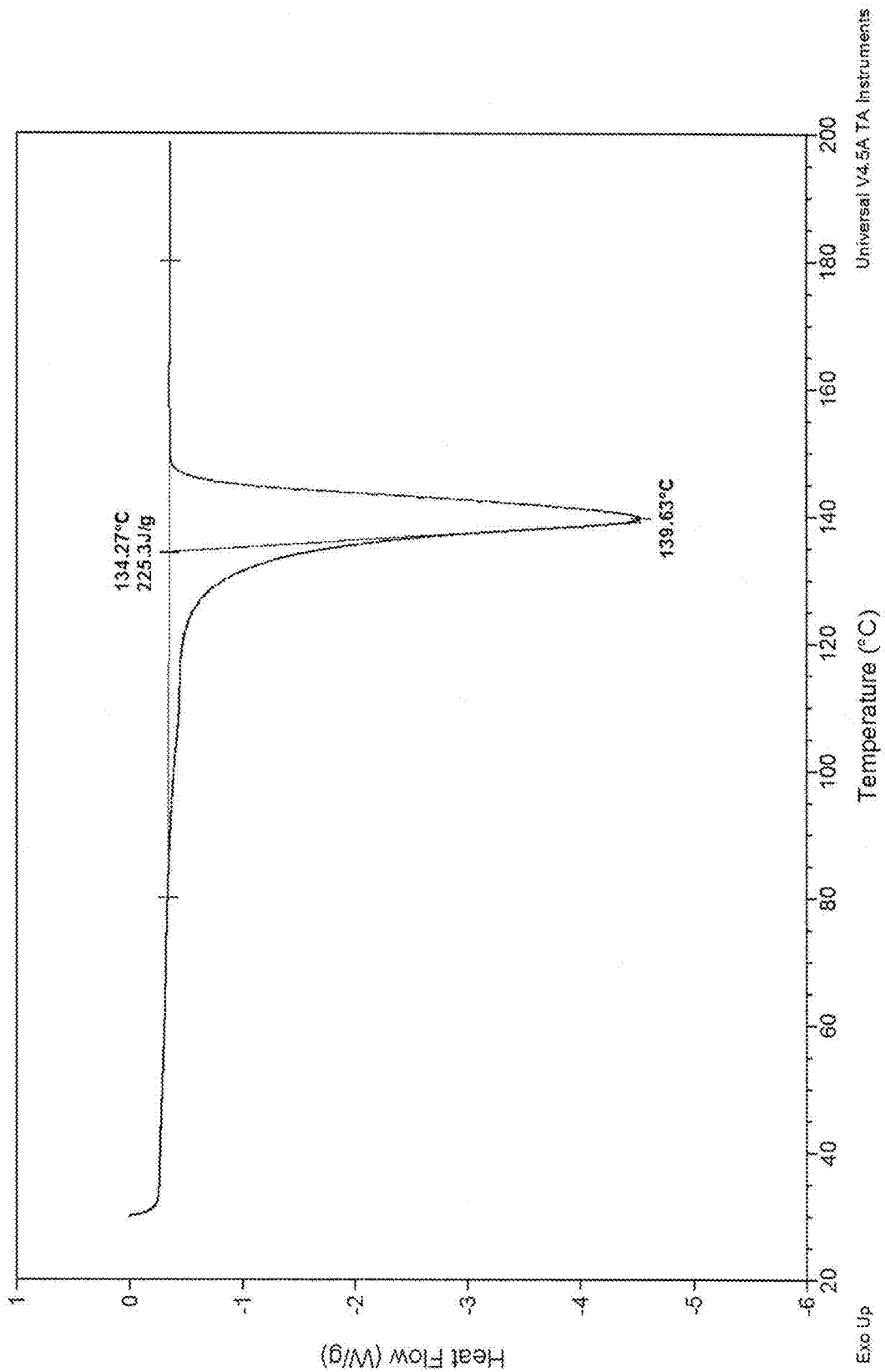
FIG. 8 is a differential scanning calorimetry (DSC) thermogram of the UHMWPE powder of Example 1 showing a melt enthalpy of 225.3 J/g.

Powder Preparation:

300 g of Ultrahigh Molecular Weight Polyethylene powder having a molecular weight of about 2,000,000 as reported by the manufacturer (MIPELON™ PM-200, commercially available Mitsui Chemicals America, Inc., Rye Brook, N.Y.) and a melt enthalpy of 225.3 J/g as determined by DSC was placed in a 2 liter screw cap jar. A DSC thermogram illustrating the 225.3 J/g melt enthalpy of the UHMWPE powder is set forth in FIG. 8. 120 ml of light mineral oil was added and thoroughly mixed (Ratio: 40 ml mineral oil/100 g powder). The jar was closed and placed in a laboratory oven (Gruenberg Model #080H120, commercially available from SPX Thermal Product Solutions, White Deer, Pa.) set at 80° C. for 48 hours to wet (condition) the mixture. The mixture was then removed from the oven and stored at room temperature until calendering.

Tape Calendar Process:

The lubricated polymer was placed in the laboratory oven at 80° C. to preheat for approximately 1.5 hours before the calendar process was started. On the calendar machine, 20.3 cm diameter rolls were preheated to 127° C. with the gap between the rolls set at 0.10 mm and dams installed to produce a 15.2 cm wide tape. One roll was set to a speed of 0.91 m/min and the other roll was set to a speed 20% faster. The lubricated polymer was introduced into the gap. A continuous opaque flexible tape approximately 0.19 mm thick was produced.

Removal of Lubricant:

The tape was washed by dipping in a beaker filled with hexane to remove the mineral oil and allowed to air dry.

Uniaxial Expansion:

Samples were cut from the tape and placed in an MTS machine (810 Model No. 318.10 commercially available from MTS Systems Corporation, Eden Prairie, Minn.) with a 2.5 kN MTS Force Transducer (Model No. 661-18E-02, commercially available from MTS Systems Corporation, Eden Prairie, Minn.). The samples were maintained at a temperature of 135° C. in an oven mounted on the machine for a period of 5 minutes. Samples were pulled to an extension of 500% and 1000% at rates ranging from 5%/sec to 20,000%/sec. The matrix tensile strength of these wnaxially expanded samples was measured on an Instron® 5500R Tensile Test Machine (commercially available from Instron® Machine of Canton, Mass.). The results are shown below for the transverse direction (perpendicular to the calendared direction). The unexpanded tape had a matrix tensile strength of 1400 psi in the transverse direction.
Transverse Direction Matrix Tensile Strength

| Extension 500% | | Extension 1000% | |
|---|---|---|---|
| Rate (%/sec) | MTS (MPa) | Rate (%/sec) | MTS (MPa) |
| 5 | 78.6 | 5 | 133.2 |
| 10 | 107.1 | 10 | 152.9 |
| 100 | 111.4 | 100 | 164.8 |
| 1000 | 130.2 | 1000 | 177.5 |
| 10,000 | 127.2 | 10,000 | broke |
| 20,000 | 116.6 | | |

Example 2

Figure 2:
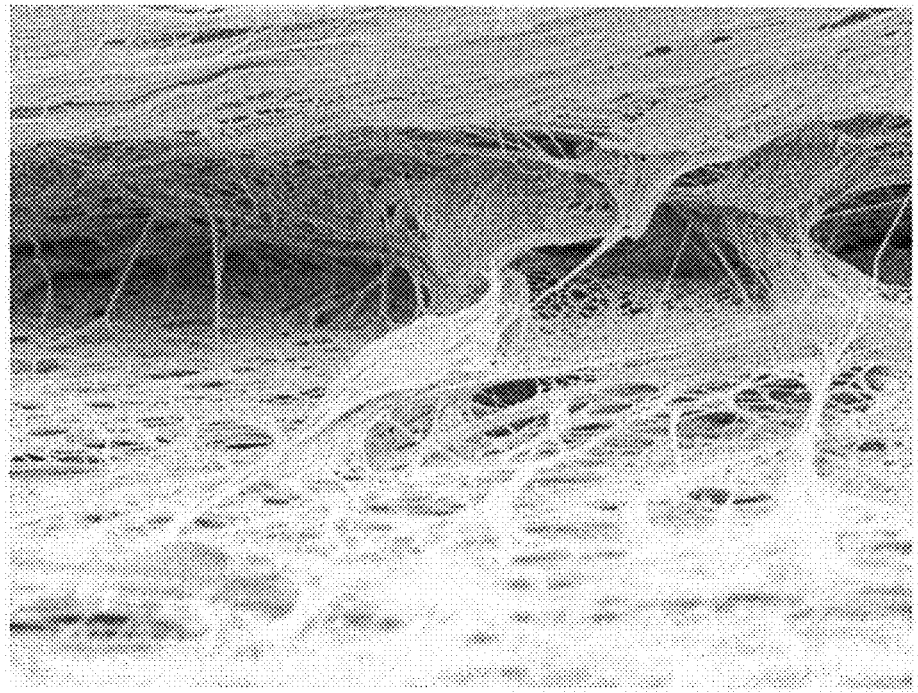
FIG. 2 is a scanning electron micrograph (SEM) of the cross-section of the expanded UHMWPE membrane of Example 2 taken at 15,000× magnification.
Figure 3:
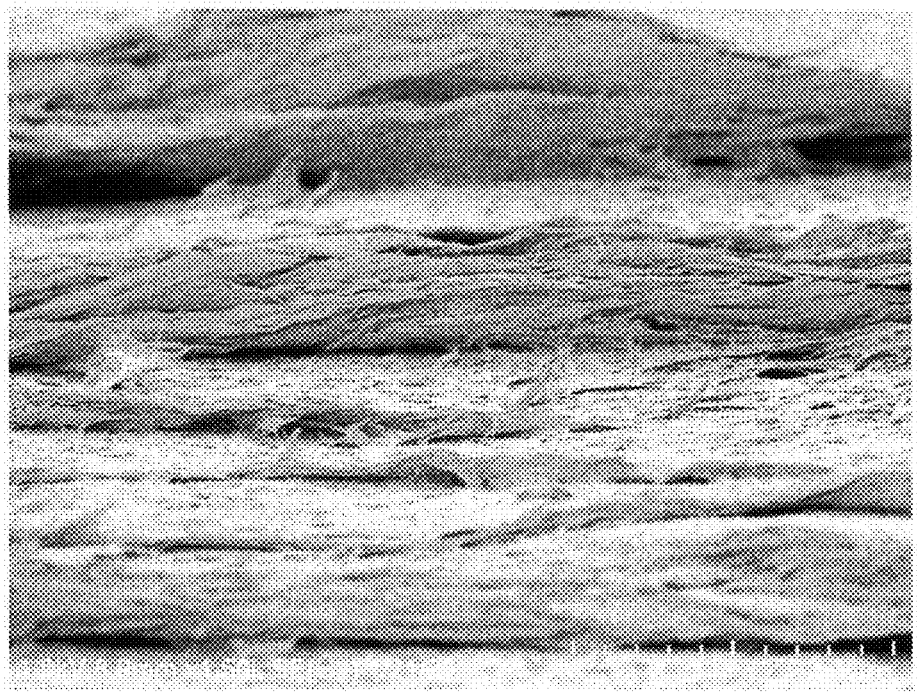
FIG. 3 is a scanning electron micrograph (SEM) of the cross-section of the expanded UHMWPE membrane of Example 2 taken at 1,500× magnification.

The powder was prepared as described in Example 1.
Tape Calendar Process:
The lubricated resin as placed in a laboratory oven (Gruenberg Model #08011120, commercially available from SPX Thermal Product Solutions, White Deer, Pa.) at 80° C. to preheat for 1.5 hours before the calendar process was started. On a calendaring machine, 20.3 cm diameter rolls were preheated to 129° C. with the gap between the rolls set at 0.05 mm and dams installed to produce a 15.2 cm wide tape. The rolls were set to a speed of 0.91 m/min. The UHMWPE resin was introduced into the gap. A continuous opaque flexible tape approximately 0.14 mm thick was produced.
Biaxial Expansion:
Samples were cut from the tape and placed in a Karo IV biaxial expansion machine (commercially available from Brückner Group, GmbH) and simultaneously stretched 1.5× in the calendared direction and 6× in the transverse (perpendicular to the calendar) direction at 10%/sec at 135° C. A scanning electron micrograph (SEM) of the surface of the expanded UHMWPE membrane taken at 15,000× magnification is shown in FIG. 1. A cross-section of the expanded UHMWPE membrane taken at 15,000× magnification is illustrated in FIG. 2. FIG. 3 depicts an SEM of the cross-section of the expanded UHMWPE membrane taken at 1,500× magnification.
Properties of Biaxially Expanded Membrane:
Matrix Tensile Strength:
Machine Direction: 108.7 MPa
Transverse Direction: 97.7 MPa
Porosity: 61.7%—Calculated using sample density and a UHMWPE polymer density of 0.94 and utilizing the Percent Porosity Calculation test method described herein.
Gurley: 120 seconds
Bubble Point: 40

Example 3

Figure 9:
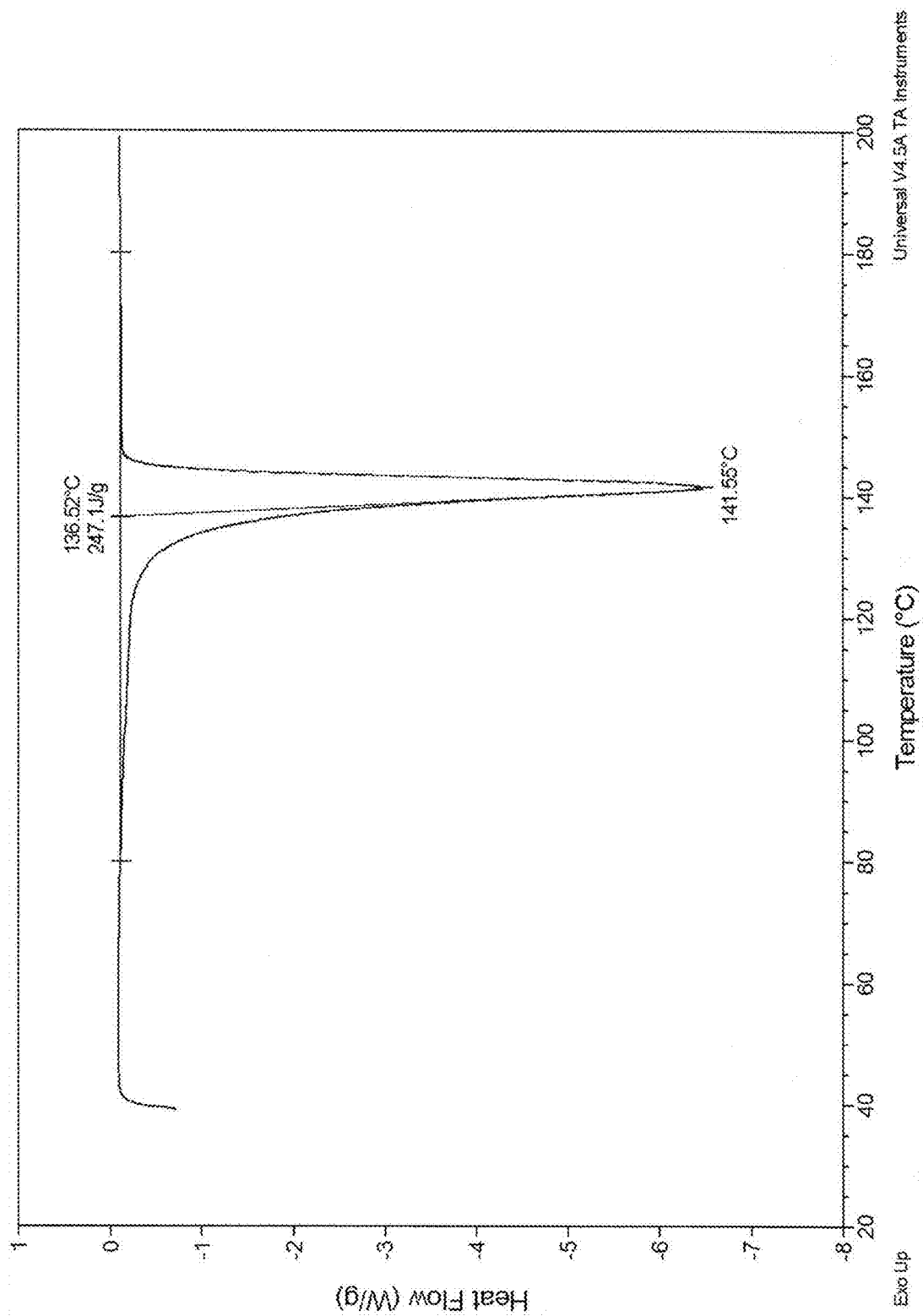
FIG. 9 is a differential scanning calorimetry (DSC) thermogram of the UHMWPE powder of Example 3 showing a melt enthalpy of 247.1 J/g.

The powder and tape were prepared using the methods described in Example 2 with the following exception: an Ultrahigh Molecular Weight Polyethylene powder having a molecular weight of about 4,000,000 as reported by the manufacturer (Ticona X-168, commercially available from Ticona Engineering Polymers, Michigan) and a melt enthalpy of 247.1 J/g as determined by DSC was utilized. A DSC thermogram illustrating the 247.1 J/g melt enthalpy of the UHMWPE powder is Set forth in FIG. 9.

Figure 5:
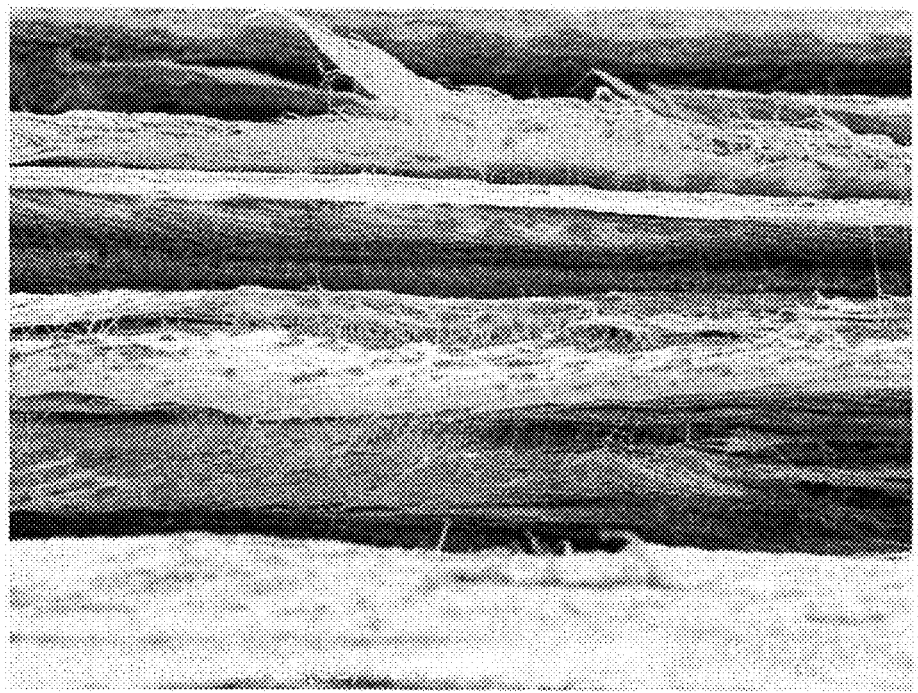
FIG. 5 is a scanning electron micrograph (SEM) of the cross-section of the expanded UHMWPE membrane of Example 3 taken at 1,500× magnification.

Biaxial Expansion:
The same method of expansion was used as described in Example 2 with the exception that the tape was stretched 1.5× in the calendered direction and 3× in the transverse (perpendicular to the calendar) direction. A scanning electron micrograph (SEM) of the surface of the expanded UHMWPE membrane taken at 15,000× is shown in FIG. 4. A scanning electron micrograph (SEM) of the cross-section of the expanded UHMWPE membrane taken at 1,500× magnification is shown in FIG. 5.
Properties of Biaxially Expanded Membrane:
Matrix Tensile Strength:
Machine Direction Matrix Tensile Strength: 1017 MPa
Transverse Direction Matrix Tensile Strength: 41.3 MPa
Porosity: 64.7%—Calculated using sample density and a UHNIWPE polymer density of 0.94 and utilizing the Percent Porosity Calculation test method described herein.
Gurley: 80 seconds
Bubble Point: 23

Example 4

The resin was prepared as in Example 1.
Tape Calendar Process:
The lubricated resin was placed in a laboratory oven (Gruenberg Model #080H120, commercially available from SPX Thermal Product Solutions, White Deer, Pa.) at 80° C. to preheat for 1.5 hours before the calendar process was started. On the calendar machine. 20.3 cm diameter rolls were preheated to 131° C. with the gap between the rolls set at 0.05 mm and dams installed to produce a 15.2 cm wide tape. The rolls were set to a speed of 0.91 m/min. The resin was introduced into the gap. A continuous opaque flexible tape approximately 0.15 mm thick was produced.
Uniaxial Expansions:
Samples were cut from the tape and placed in an Interlaken Model No. WSC506 expansion machine. Temperature was maintained at 135° C. using a Convection Oven (Model No. 010-12-12-36, commercially available from Them Craft, Inc., Winston Salem, N.C.). Samples were pulled to an extension of 1000% at rates of 10%/sec and 100%/sec. The material was extended to 18×, which was the maximum capable for the machine. The matrix tensile strength of these uniaxially expanded samples was measured as described in the test methods described herein.
Transverse Direction Matrix Tensile Strength (MTS):

| Extension: | Rate | MTS (MPa) |
|---|---|---|
| 18X | 100%/sec | 786.2 |
| 10X | 10%/sec | 358.4 |
| 10X | 100%/sec | 475.2 |

Example 5

Figure 10:
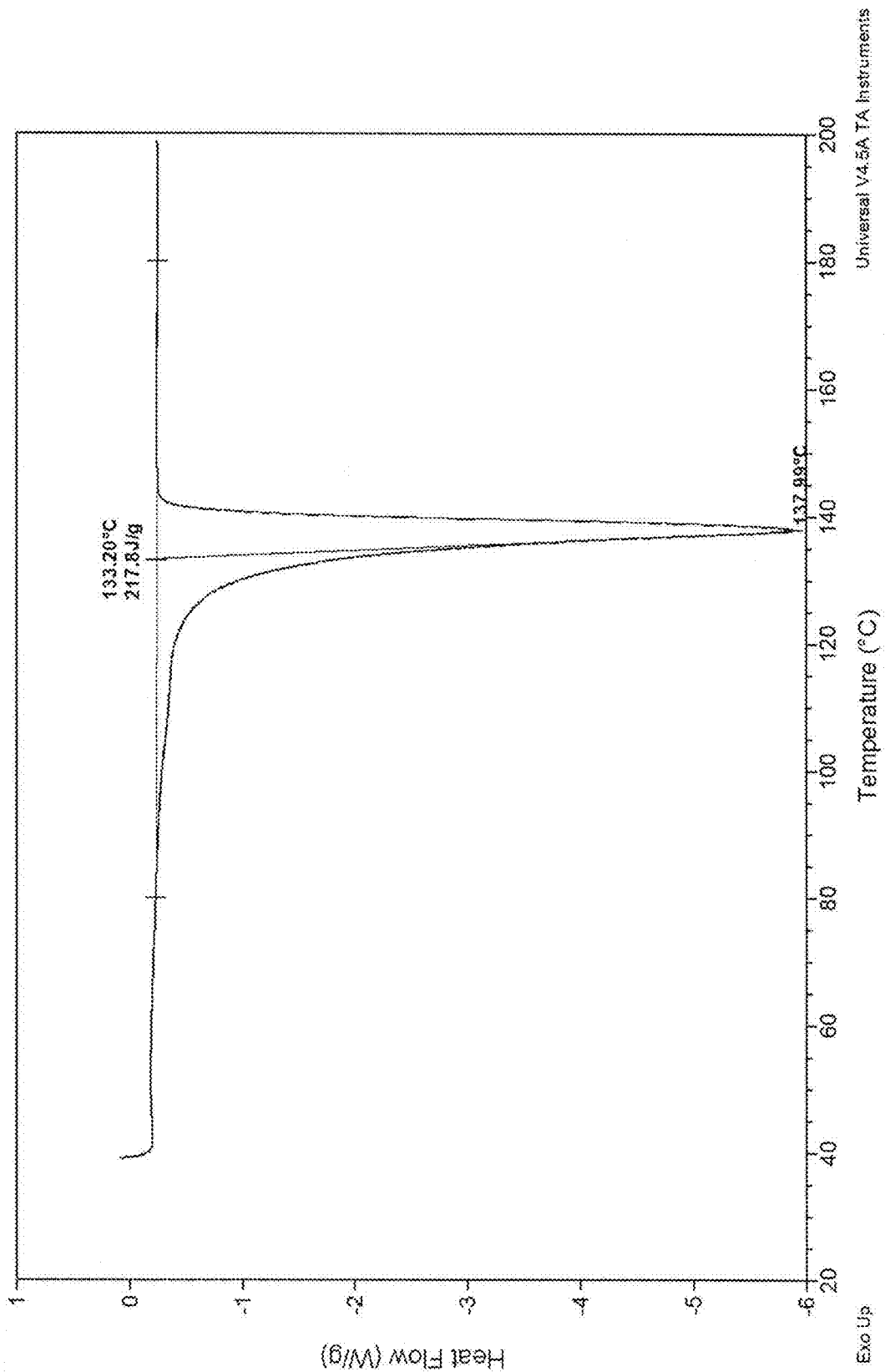
FIG. 10 is a differential scanning calorimetry (DSC) thermogram of the UHMWPE powder of Example 5 showing a melt enthalpy of 217.8 J/g.

The powder and tape were prepared using the methods described in Example 4 with the following exception an Ultrahigh Molecular Weight Polyethylene powder having a molecular weight of about 1,250,000 as reported by the manufacturer (Ticona 4012, Ticona, Florence, Ky.) and a melt enthalpy of 217.8 J/g as measured by DSC was utilized. A DSC thermogram illustrating the 217.8 J/g melt enthalpy of the UHMWPE powder is set forth in FIG. 10. A tape with a thickness of 0.19 mm was produced.

Uniaxial Expansions:

Samples were cut from the tape and placed in an Interlaken Model No. WSC506, Temperature was maintained at 135° C. using a Convection Oven (Model No. 010-12-12-36, commercially available from Them Craft, Inc., Winston Salem, N.C.) Samples were pulled to an extension of 1000% at rates of 10%/sec and 100%/see. The material broke at any rate above 100%/sec. The matrix tensile strength of these uniaxially expanded samples svas measured as described in the test methods set forth herein.

Matrix Tensile Strength:

| Extension | Rate | MTS (MPa) |
|---|---|---|
| 18X | 10%/sec | sample broke during processing |
| 10X | 10%/sec | 167.1 |
| 10X | 100%/sec | 220.9 |

Example 6

The powder was prepared as described in Example 1.

Tape Calendar Process:

The lubricated resin was placed in the laboratory oven at 80° C. to preheat for 1.5 hours before the calendar process was started. On the calendar machine, 20.3 cm diameter rolls were preheated to 141° C. with the gap between the rolls set at 0.05 mm and dams installed to produce a 15.2 cm wide tape. The rolls were set to a speed of 0.91 m/min. The resin was introduced into the gap. A continuous opaque flexible tape approximately 0.25 mm thick was produced. The appearance of the tape was translucent.

Biaxial Expansion:

Samples were cut from the tape and placed in a Karo IV biaxial expansion machine (commercially available from Brückner Group, GmbH). It was simultaneously restrained in the calendared direction and stretched 5× in the transverse (perpendicular to the calendar) direction at 10%/sec at 135° C. There was no measureable air flow in the Gurley Test after 30 minutes, indicating that there is no porosity through the membrane.

Comparative Example

Ultrahigh Molecular Weight Polyethylene powder used in Example 1 having a molecular weight of about 2,000,000 as reported by the manufacturer (MIPELON™ PM-200, Mitsui Chemicals) was used without lubricant in an as-received condition in the calendaring process.

Tape Calendar Process:

The polymer was placed in the laboratory oven at 80° C. to preheat for 1.5 hours before the calendar process was started. On the calendar machine, 20.3 cm diameter rolls were preheated to 129° C. with the gap between the rolls set at 0.05 mm and dams installed to produce a 15.2 cm wide tape. The rolls were set to a speed of 0.91 m/min. The polymer was introduced into the gap. A translucent tape was formed and collected. The resulting tape was too brittle for any further processing.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A porous ultra high molecular weight polyethylene (UHMWPE) article comprising:
   a porous membrane formed from a UHMWPE polymer having a molecular weight from about 2,000,000 g/mol to about 10,000,000 g/mol and a first endotherm from about 139° C. to about 143° C. and a melt enthalpy greater than about 225 J/g, said membrane having a structure of nodes interconnected by fibrils,
   wherein said UHMWPE membrane has a second endotherm associated with said fibrils in the porous membrane,
   wherein the second endotherm is from 145° C. to 155° C. such that the second endotherm is above said first endotherm of said UHMWPE polymer, and
   wherein said UHMWPE membrane has a porosity of at least about 25%.

2. The porous article of claim 1, wherein said second endotherm is about 150° C.

3. The porous article of claim 1, wherein said UHMWPE polymer includes from about 0.001 mol % to about 10 mol % of a comonomer.

4. The porous article of claim 3, wherein said comonomer is an alpha-olefin or cyclic olefin having 3 to 20 carbon atoms.

5. The porous article of claim 1, wherein said UHMWPE membrane has a thickness less than about 1 mm.

6. The process of claim 1, wherein said UHMWPE membrane has a thickness from about 0.08 mm to about 0.5 mm.

7. The porous article of claim 1, wherein said UHMWPE membrane has a porosity of at least about 60%.

8. The porous article of claim 1, wherein said UHMWPE membrane has a percent porosity of at least about 75%.

9. The porous article of claim 1, wherein said UHMWPE membrane has a percent porosity of at least about 85%.

10. The porous article of claim 1, wherein said UHMWPE polymer has a molecular weight from about 2,000,000 g/mol and about 4,000,000 g/mol.

11. The porous article of claim 1, wherein said article is selected from a sheet, membrane, fiber, tube and three dimensional self-supporting structure.

* * * * *